(12) United States Patent
Maier

(10) Patent No.: US 6,800,867 B2
(45) Date of Patent: Oct. 5, 2004

(54) SYSTEM FOR MEASURING A PARAMETER INSIDE AN ADVERSE ENVIRONMENT WHILE PROTECTING THE ADVERSE ENVIRONMENT AGAINST POTENTIALLY DANGEROUS THREATS WITH AN ACTIVE SAFETY BARRIER CIRCUIT

(75) Inventor: Lawrence Carl Maier, New Haven, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 0 days.

(21) Appl. No.: 10/285,039

(22) Filed: Oct. 31, 2002

(65) Prior Publication Data

US 2004/0084608 A1 May 6, 2004

(51) Int. Cl.[7] ............................................. G02B 27/00
(52) U.S. Cl. .................................. 250/551; 340/310.01
(58) Field of Search ................................. 250/551, 221, 250/227.14; 340/310.01

(56) References Cited

U.S. PATENT DOCUMENTS

| | | | |
|---|---|---|---|
| 4,963,729 A | | 10/1990 | Spillman et al. |
| 5,568,815 A | * | 10/1996 | Raynes et al. ............... 600/485 |
| 5,818,846 A | * | 10/1998 | Mori et al. .................. 370/532 |
| 6,115,654 A | | 9/2000 | Eid et al. |

* cited by examiner

*Primary Examiner*—Thanh X. Luu
(74) *Attorney, Agent, or Firm*—Calfee, Halter & Griswold LLP; David R. Percio, Esq.

(57) ABSTRACT

An active safety barrier circuit is disposable in series with an electrical conductor at a barrier between an adverse environment and an outside environment for passing an analog signal over the electrical conductor across the barrier while preventing potentially dangerous electrical threats from entering the adverse environment over the electrical conductor. The safety barrier circuit comprises: an analog-to-digital converter circuit for converting sequential time samples of the analog signal to a train of electrical digitally coded words which are output sequentially from the analog-to-digital converter circuit; an optical isolator for converting the electrical digitally coded words into light signals which are passed across an electrically non-conductive barrier which prevents potentially dangerous electrical threats from entering the adverse environment over the electrical conductor, and for reconverting the light signals back into the electrical digitally coded words after crossing the non-conductive barrier, the reconverted electrical digitally coded words being output sequentially from the optical isolator; and a digital-to-analog converter circuit for reconstructing the analog signal from the reconverted electrical digitally coded words being received sequentially from the optical isolator without affecting substantially the accuracy thereof.

16 Claims, 4 Drawing Sheets

SYSTEM FOR MEASURING A PARAMETER INSIDE AN ADVERSE ENVIRONMENT WHILE PROTECTING THE ADVERSE ENVIRONMENT AGAINST POTENTIALLY DANGEROUS THREATS WITH AN ACTIVE SAFETY BARRIER CIRCUIT

BACKGROUND OF THE INVENTION

The present invention is directed to safety barrier circuits for preventing potentially dangerous electrical threats from entering an adverse environment over electrical conductors which convey analog signals between the adverse environment and an environment outside the adverse environment, and more particularly, to an active safety barrier circuit of the optical isolation type for passing analog signals over an electrical conductor across the barrier between the adverse and outside environments without affecting substantially the accuracy thereof.

Adverse environments are areas, like aircraft fuel tanks, for example, in which sufficient concentrations of reactive materials are present in a state to potentially cause an explosive reaction pending the introduction of an ignition source. Thus, an ignition source would be considered a dangerous threat to such an environment. Examples of potential electrical ignition sources are high voltages, lightning, high intensity radio frequency signals, and the like. Safety barriers circuits prevent these potentially dangerous threats from propagating through electrical conductors which pass signals to and from the adverse environment across a barrier, such as a fuel tank wall, for example.

Some types of safety barrier circuits use resistance in series with the electrical conductor and transient absorbing devices, like high powered zeners, for example, coupled between the electrical conductor and ground potential. Typically, adverse environments may undergo large temperature swings which affect the resistance of these safety barriers. On an aircraft, for example, areas outside of the pressurized vessel where the fuel tanks are disposed may undergo temperature variations from −65° C. to +85° C. This temperature induced change in resistance may create errors in the measurement signals being passed by the safety barriers. In addition, the transient absorbing devices have a tendency to inject noise in the ground loop of the measurement which may cause overall system type errors. Accordingly, this type of safety barrier circuit is not well suited for passing sensing and measuring signals requiring high accuracy.

Another type of safety barrier circuit is the optical isolator type in which a light source and light detector are disposed in series with the electrical conductor. An electrically non-conducting material, like glass, for example, is disposed between the source and detector for passing light therebetween while creating a barrier which prevents potentially dangerous electrical threats from passing into the adverse environment over the electrical conductor. However, optical isolators have inherent non-linear transfer characteristics which are substantially altered with variations in temperature. This trait of optical isolator type safety barrier circuits render them useless for passing analog signals accurately.

Some system designers have proposed converting an analog measurement signal into a digital time based signal of a single width modulated pulse or a series of start and stop pulses having a modulated interpulse period. An example of such a system is disclosed in U.S. Pat. No. 4,963,729, entitled "Optically Powered Sensor System with Improved Signal Conditioning", and assigned to the same assignee as the instant application. In either case, the changing transfer characteristics of the optical isolator with temperature may alter the shape of the pulse being passed thereby and thus, introduce an error in the time based measurement. In addition, the process for converting the analog signal or measurement into timing signals may cause a greater response time for the measurement readings and ultimately, affect the accuracy thereof.

In some adverse environments, especially those which are enclosed, like an aircraft fuel tank, for example, fuel sensing and measuring equipment and the interconnecting cabling therefor are disposed throughout the tank and aircraft before the enclosure thereof. Once enclosed, it is difficult to make modifications within the tank and aircraft. Accordingly, it would be of paramount importance to retain the existing sensing and measuring equipment and the interconnecting cabling in the performance of any retrofit for adding or improving immunity of these adverse environments to electrical ignition sources.

SUMMARY OF THE INVENTION

In accordance with one aspect of the present invention, an active safety barrier circuit is disposable in series with an electrical conductor at a barrier between an adverse environment and an outside environment for passing an analog signal over the electrical conductor across the barrier while preventing potentially dangerous electrical threats from entering the adverse environment over the electrical conductor. The safety barrier circuit comprises: an analog-to-digital converter circuit for converting sequential time samples of the analog signal to a train of electrical digitally coded words representative thereof, the electrical digitally coded words of the train being output sequentially from the analog-to-digital converter circuit; an optical isolator coupled to the analog-to-digital converter circuit for converting the electrical digitally coded words output therefrom into light signals representative thereof which are passed across an electrically non-conductive barrier, and for reconverting the light signals back into the electrical digitally coded words after crossing the non-conductive barrier, the reconverted electrical digitally coded words being output sequentially from the optical isolator, the non-conductive barrier for preventing potentially dangerous electrical threats from entering the adverse environment over the electrical conductor; and a digital-to-analog converter circuit coupled to the optical isolator for reconstructing the analog signal from the reconverted electrical digitally coded words being received sequentially from the optical isolator without affecting substantially the accuracy thereof.

In accordance with another aspect of the present invention, a system for measuring a parameter inside an adverse environment with a sensor disposed inside the adverse environment includes electrical circuitry disposed in an environment outside of the adverse environment for receiving an electrical analog measurement signal from the sensor over a first electrical conductor. The adverse environment is susceptible to a combustible reaction from dangerous electrical threats received from the outside environment over the electrical conductor. The system comprises a first active safety barrier circuit disposed in series with the first electrical conductor at the barrier between the adverse environment and the outside environment for passing the electrical analog measurement signal from the sensor to the electrical circuitry over the first electrical conductor while preventing potentially dangerous electrical threats from entering the adverse environment over the first electrical conductor.

In accordance with yet another aspect of the present invention, the system further comprises: electrical circuitry disposed in the outside environment for generating an excitation signal which is conducted to the sensor over a second electrical conductor, the adverse environment susceptible to a combustible reaction from dangerous electrical threats received from the outside environment over the second electrical conductor; and a second active safety barrier circuit disposed in series with the second electrical conductor at the barrier between the adverse environment and the outside environment for passing the excitation signal across the barrier to the sensor over the second electrical conductor while preventing potentially dangerous electrical threats from entering the adverse environment over the second electrical conductor.

DETAILED DESCRIPTION OF THE INVENTION

The active safety barrier of the present invention may be applied anywhere a safety barrier is required to prevent potentially dangerous threats from propagating from an outside environment through an electrical conductor to an adverse environment. The active safety barrier may be disposed in series with the electrical conductor at the barrier to pass an analog signal between the adverse and outside environments, thus allowing continued use of existing equipment and cabling of a sensing and measuring system, for example, and is especially beneficial for passing the analog signal without affecting substantially the accuracy and bandwidth thereof over wide temperature variations.

Figure 1:
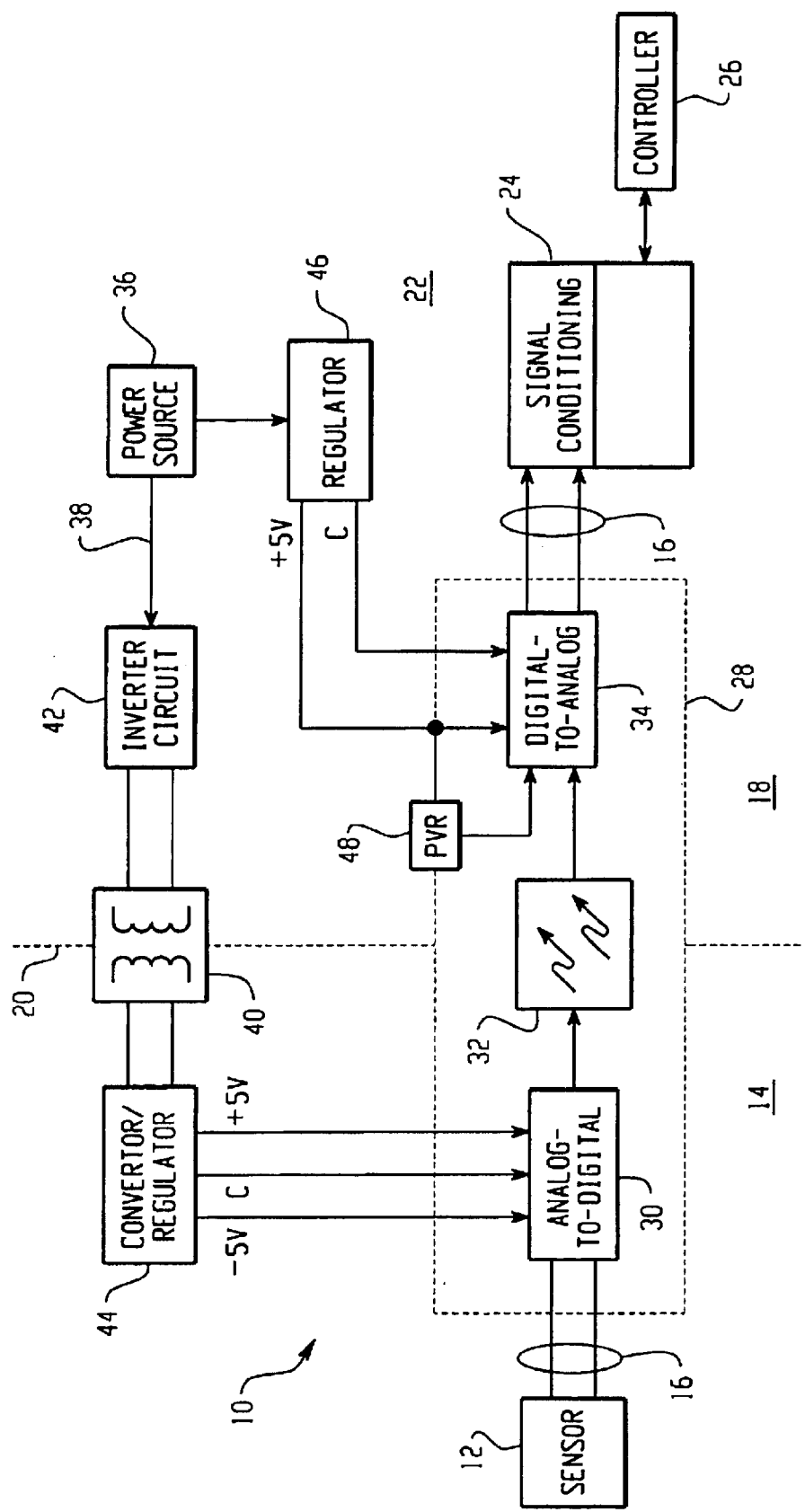
FIG. 1 is a block diagram schematic of an exemplary system utilizing an active safety barrier circuit suitable for embodying one aspect of the present invention.

An exemplary system 10 for utilizing the active safety barrier circuit of the present invention is illustrated by the block diagram schematic of FIG. 1. Referring to FIG. 1, a sensor 12 is disposed in an adverse environment 14 for measuring a parameter inside the adverse environment. An electrical analog measurement signal representative of the value of the parameter being measured is produced by the sensor 12 and passed over an electrical conductor 16 to an environment 18 outside of the adverse environment 14. A barrier between the adverse and outside environments is represented by the dashed line 20 in the illustration of FIG. 1. The adverse environment 14 is susceptible to a combustible reaction from dangerous electrical threats received from the outside environment 18 over electrical conductors carrying signals over the barrier 20, like the conductor 16, for example. Electrical circuitry 22 is disposed at the outside environment 18 for receiving and processing the analog measurement signal of the conductor 16. Circuitry 22 may include circuits 24 for signal conditioning the received analog signal, and a controller 26 for converting the conditioned analog signal into the units of its corresponding parameter measurement.

In the system 10, an active safety barrier circuit 28 is disposed in series with the electrical conductor 16 at the barrier 20 between the adverse environment 14 and the outside environment 18 for passing the electrical analog measurement signal from the sensor 12 to the electrical circuitry 22 over the electrical conductor 16 while preventing potentially dangerous electrical threats from entering the adverse environment 14 over the electrical conductor 16. In the present embodiment, the safety barrier circuit 28 includes an analog-to-digital converter circuit 30 for converting sequential time samples of the analog measurement signal of conductor 16 to a train of electrical digitally coded words representative thereof. The electrical digitally coded words of the train are output sequentially from the analog-to-digital converter circuit 30 as will become more evident from the description below. Also, included in the circuit 28 is an optical isolator 32 that is coupled to the analog-to-digital converter circuit 30 for converting the electrical digitally coded words output therefrom into light signals representative thereof which are passed across an electrically non-conductive barrier which will be described in further detail below. At the other side of the non-conductive barrier, the optical isolator 32 reconverts the light signals back into the electrical digitally coded words which are output sequentially from the optical isolator 32. The non-conductive barrier of the isolator 32 prevents potentially dangerous electrical threats from entering the adverse environment 14 over the electrical conductor 16.

Further included in the barrier circuit 28 is a digital-to-analog converter circuit 34 that is coupled to the optical isolator 32 for receiving the reconverted electrical digitally coded words sequentially therefrom and reconstructing the analog measurement signal from the reconverted electrical digitally coded words without affecting substantially the accuracy thereof. The reconstructed analog measurement signal is passed from the digital-to-analog converter circuit 34 to the signal conditioning circuits 24 of the electrical circuitry 22 over the electrical conductor 16.

The system 10 may include a power source 36 for generating electrical energy over a power line conductor 38 to the active safety barrier circuit 28. A power line safety barrier circuit 40 is disposed in series with the power line conductor 38 at the barrier 20 between the adverse environment and the outside environment for passing the electrical energy from the power source 36 to the analog-to-digital converter circuit 30 of the safety barrier circuit 28 while preventing potentially dangerous electrical threats from entering the adverse environment over the power line conductor 38. The power line safety barrier circuit 40 may comprise an isolation transformer for passing electrical energy to the analog-to-digital converter circuit 30. An isolation transformer type of safety barrier suitable for use in the present embodiment is disclosed in detail in the U.S. Pat. No. 6,141,194, issued Oct. 31, 2000, entitled "Aircraft Fuel Tank Protection Barrier and Method" and assigned to the same assignee as the instant application which is incorporated by reference herein for providing the barrier 40 in greater detail.

If the power source 36 is DC as may be the case in some aircraft applications, then an inverter circuit 42 may be disposed on the power source side of the isolation transformer for converting the DC electrical energy into AC electrical energy which is passed through the transformer of barrier circuit 40 to the adverse side 14. Coupled to the transformer barrier circuit 40 at the adverse environment side is a converter/regulator circuit 44 which converts the AC energy into DC and provides regulated DC voltages for energizing and operating the analog-to-digital converter circuit 30. In the present embodiment, these DC regulated voltages comprise −5V, +5V and a common potential or ground return to the −5V and +5V potentials, for example. Some of these voltage potentials may also supply electrical energy to the optical isolator circuit on the adverse environment side thereof which will be described in more detail supra in connection with FIG. 4.

The system 10 may further include a voltage regulator circuit 46 which regulates the electrical energy supplied from the power source 36 in the outside environment 18 to predetermined DC voltage potentials to energize and operate the digital-to-analog converter circuit 34. In the present embodiment, these DC regulated voltages comprise +5V and a common potential or ground return to the +5V potential, for example. These voltage potentials may also supply electrical energy to the optical isolator circuit on the outside environment side thereof which will also be described in more detail below. Depending on the digital-to-analog converter used in circuit 34 a precision voltage reference (PVR) circuit 48 may be used to provide the circuit 34 with a stable and accurate reference voltage for use in the digital-to-analog conversions taking place therein.

Figure 2:
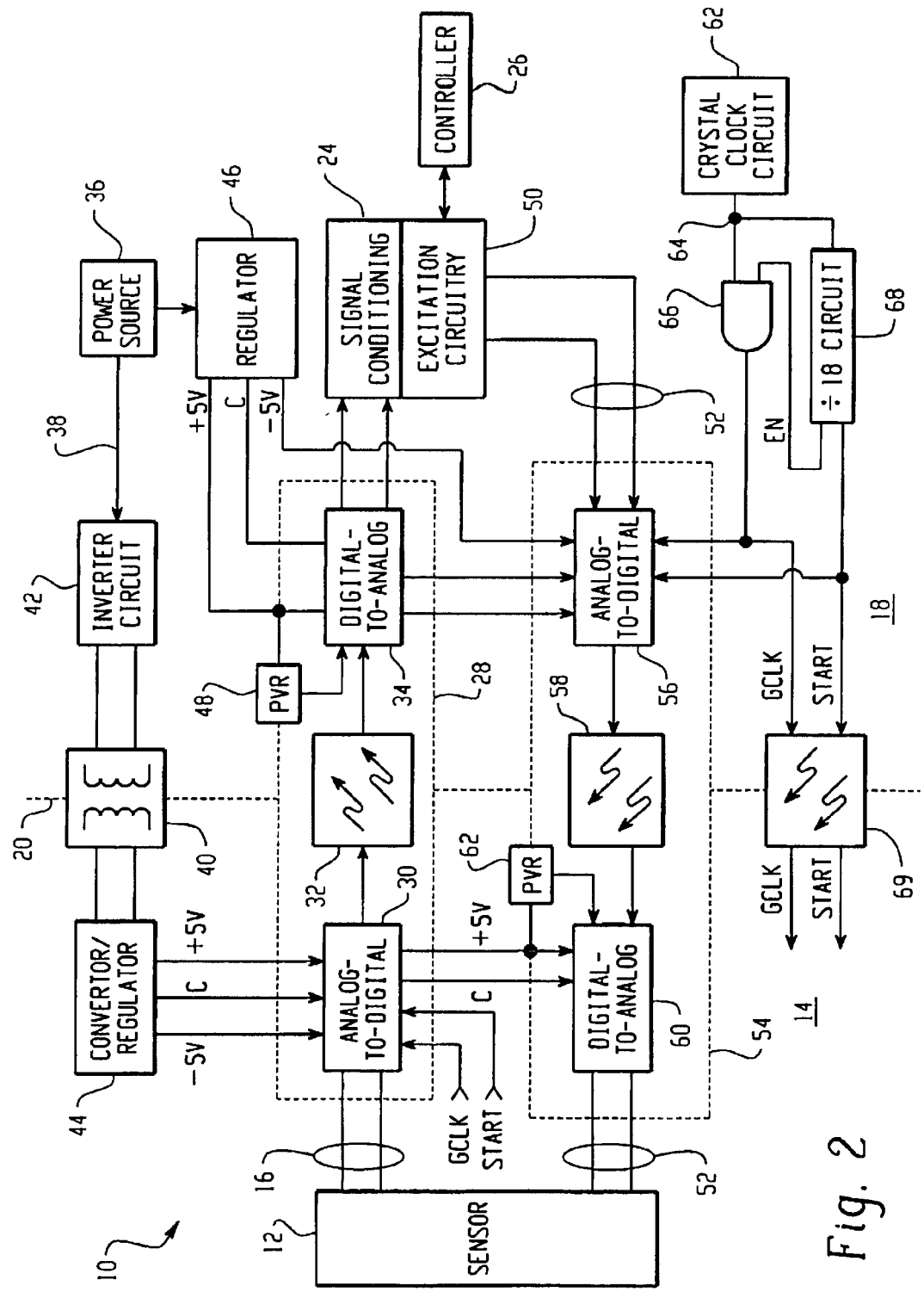
FIG. 2 is a block diagram schematic of another system utilizing two active safety barrier circuits suitable for embodying another aspect of the present invention.

Some parameter measuring sensors, like a capacitive probe, a resistive temperature detector (RTD), a strain gauge for measuring pressure, a linear variable differential transformer (LVDT), ultrasonic transducer and the like, for example, require very stable and accurate AC, DC or pulsed excitation signals in their operation in order to maintain a desired accuracy of the analog parameter measurement signal output therefrom. A system for embodying this aspect of the present invention is shown in the block diagram schematic of FIG. 2. In this embodiment, system elements already described in connection with the embodiment of FIG. 1 will maintain their reference numerals. Referring to FIG. 2, the electrical circuitry 22 may include excitation circuitry 50 for generating a stable and accurate electrical excitation signal to the sensor 12 over a second electrical conductor 52. Accordingly, a second active safety barrier circuit 54 is disposed in series with the second electrical conductor 52 at the barrier 20 between the adverse environment 14 and the outside environment 18 for passing the electrical excitation signal from the excitation circuitry 50 to the sensor 12 over the second electrical conductor 52 while preventing potentially dangerous electrical threats from entering the adverse environment 14 over the second electrical conductor 52.

The second active safety barrier circuit 54 comprises: an analog-to-digital converter circuit 56, an optical isolator 58 and digital-to-analog converter circuit 60 in the same or a similar arrangement and operation as described for the safety barrier 28 herein above except that the analog-to-digital converter circuit 56 is operative to convert sequential time samples of the analog excitation signal to a train of electrical digitally coded words representative thereof, the electrical digitally coded words of the train being output sequentially from the analog-to-digital converter circuit to the optical isolator 58, and the digital-to-analog converter circuit 60 receives the sequentially output words from the optical isolator 58 and reconstructs the analog excitation signal therefrom without affecting substantially the accuracy thereof. The reconstructed analog excitation signal is passed from the digital-to-analog converter circuit 60 to the sensor 12 over the conductor 52. As in circuit 28, the non-conductive barrier of optical isolator 58 prevents preventing potentially dangerous electrical threats from entering the adverse environment 14 over the second electrical conductor 52.

Also, in the embodiment of FIG. 2, regulated voltage potentials +5V and common may be supplied to the digital-to-analog converter circuit 60 from the same converter/regulator circuit 44. If needed, a PVR circuit 62 may be included to provide a reference voltage potential to the digital-to-analog converter circuit 60 from the +5V regulated supply, for example. In addition, regulator circuit 46 may be configured to generate an additional regulated voltage potential of −5V, for example, which is used along with the +5V supply and common potential for energizing and operating the analog-to-digital converter circuit 56. In this manner, the digital-to-analog converter circuit 34 of safety barrier 28 and the analog-to-digital converter circuit 56 of safety barrier 54 may be supplied voltage regulated electrical energy from the same source at the outside environment 18. Like wise, the digital-to-analog converter circuit 60 of safety barrier 54 and the analog-to-digital converter circuit 30 of safety barrier 28 may be supplied voltage regulated electrical energy from the same source at the adverse environment 14. It is understood however, that this arrangement need not be the case, and that electrical energy may be supplied to the two active safety barriers 28 and 54 from independent sources just as well without deviating from the broad principles of the present invention.

Moreover, the analog-to-digital circuits on both sides of the barrier 20, like those shown at 30 and 56, for example, may use clock and start conversion signals for the operation thereof as will become more evident from the description below. In order to save on electrical energy conducted across the barrier 20 through isolation circuit 40, common circuitry for the generation of these clock and start conversion signals may be included in the circuits at the outside environment 18 and powered by the power source 36, for example. As shown in the embodiment of FIG. 2, this common circuitry may include a crystal clock circuit 62 which may be of the type manufactured by Valpey-Fisher Co. under the model no. VF540H, for example. The clock circuit 62 may be configured to generate a clock signal which may be on the order of eight megahertz (8 MHz), for example, over signal line 64 which is coupled to one input of a gating circuit 66 and an input of a divide-by-eighteen circuit 68.

For the present embodiment, the circuit 68 generates a pulse every 2.25 microseconds or at a frequency of 444.444 KHz over the signal line START which is the start conversion signal for controlling analog-to-digital converters on both sides of the barrier. In addition, the circuit 68 also generates an enable signal which is coupled to another input of the gating circuit 66 over signal line EN. The enable signal is high for sixteen clock pulses and then, low for 2 clock pulses. This high and low sequence is repeated periodically. Thus, the gating circuit 66 responds to the enable signal to generate a gated clock signal of 16 clock pulses every 18 clock pulses over signal line GCLK which is the gated clock signal for controlling the analog-to-digital converters on both sides of the barrier. To protect the adverse environment 14 against threats over the lines START and GCLK when passed through barrier 20, optical isolators 69 may be disposed in series with such lines at the barrier 20. The optical isolators 69 may be similar to those 32 and 58 used for the active safety barriers 28 and 54, for example.

It is understood however, that the common circuitry for the generation of common gated clock and start conversion signals is being used merely to save from passing electrical energy through the power safety barrier 40 and need not be the embodiment for all circumstances. Rather, separate generation circuitry may be included on both sides of the barrier with each generating the gated clock and start conversion signals for the analog-to-digital converter circuit(s) on its respective side of the barrier. This alternate embodiment will operate just as well without deviating from the broad principles of the present invention.

Figure 3:
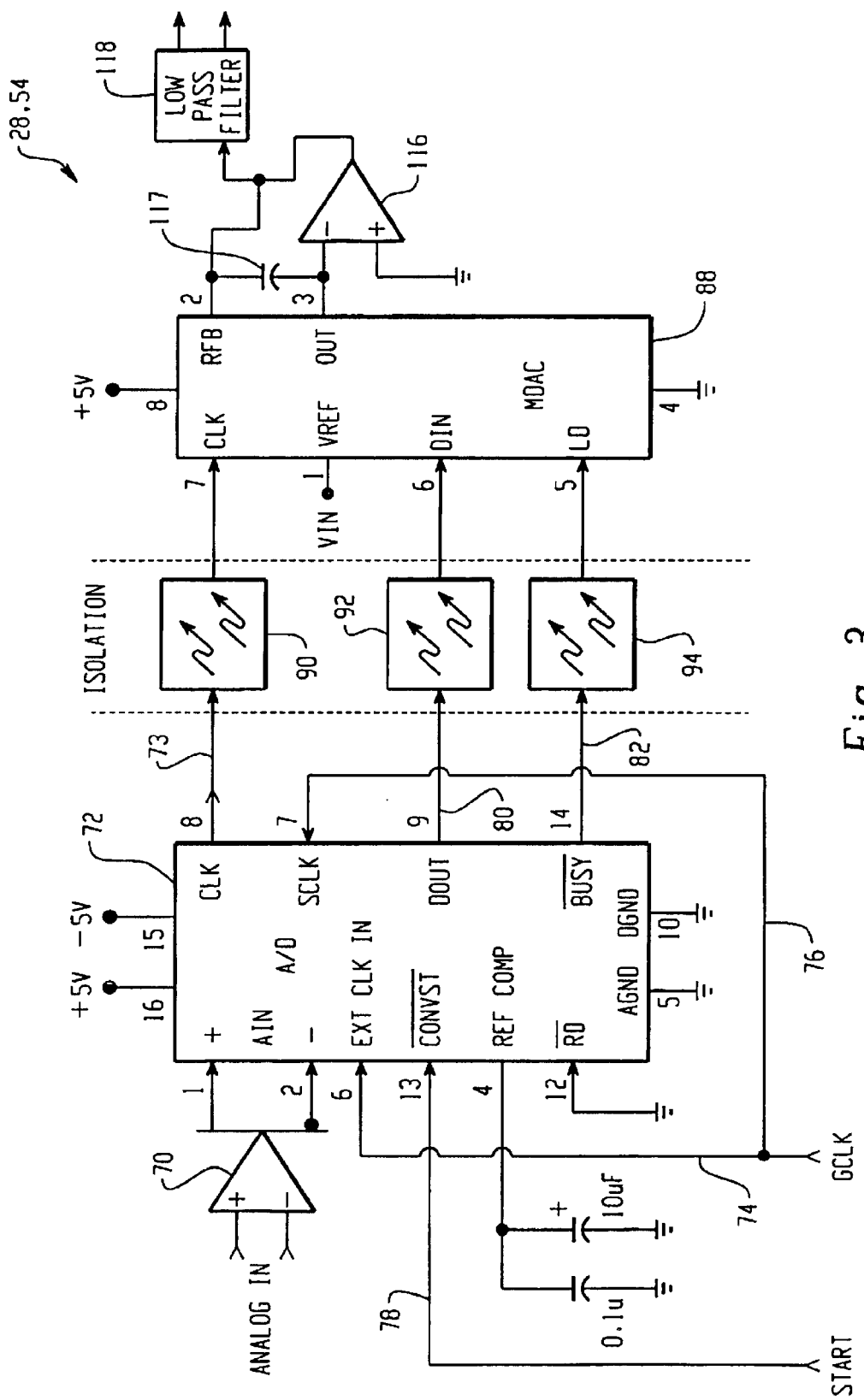
FIG. 3 is a block diagram schematic of an exemplary active safety barrier circuit suitable for use in the embodiments of FIGS. 1 and 2.

An active safety barrier circuit suitable for use in the embodiments of FIGS. 1 and 2 is shown in the exemplary circuit schematic of FIG. 3. Referring to FIG. 3, the analog measurement or excitation signal as the case may be is coupled to a differential amplifier circuit 70, the output of which being coupled to a differential input $A_{in}$ (pins 1 and 2)of an analog-to-digital converter circuit 72 which may be an integrated circuit of the type manufactured by Linear Technology Corp. bearing model no. LTC 1417, for example. If a single ended analog signal is to be conducted over the barrier 20, then a single input/output amplifier 70 may be used. In the present embodiment, time sampled analog-to-digital conversions are performed by the circuit 72 using a successive approximation technique governed by the gated clock signal GCLK coupled to pin 6 over line 74 and the start conversion signal START coupled to pin 13 over line 78, which signals have been described infra.

Accordingly, each time circuit 72 receives a start convert signal at pin 13, it performs a successive approximation digital conversion of a corresponding time sample of the analog input signal. In the particular embodiment, each conversion results in a 16 bit digital word which is bit serially output at pin 9 of circuit 72 either as it is being produced or from an internal buffer storing a previous digital word conversion. The serial bit output from the internal buffer may be governed by the gated clock signal GCLK coupled to pin 7 over line 76. Each 16 bit digital word is an accurate representation of a time sample of the analog input signal. Thus, during successive digital conversions, the converted digital words are sequentially and bit serially output from the circuit 72 at pin 9 over signal line 80 starting with the most significant bit (MSB) and ending with the least significant bit (LSB), for example. The MSB may be a sign bit if the analog input signal includes both positive and negative amplitude values. A clock signal CLK synchronized to the bit serial output digital word is output from circuit 72 at pin 8 over signal line 73. Also, in the present embodiment, circuit 72 outputs a busy signal at pin 14 over signal line 82 indicating that circuit 72 is performing a current conversion and bit serially outputting a time sampled digital word over signal line 80. A ready input at pin 12 of circuit 72 may be coupled to the common potential. Circuit 72 may include an analog ground at pin 5 and a digital ground at pin 10 which may be coupled over separate lines to the common potential of the respective voltage regulator circuit. In addition, +5V and −5V supplies may be coupled to the circuit 72 at pins 16 and 15, respectively, from the respective voltage regulator (see FIGS. 1 and 2).

Figure 4:
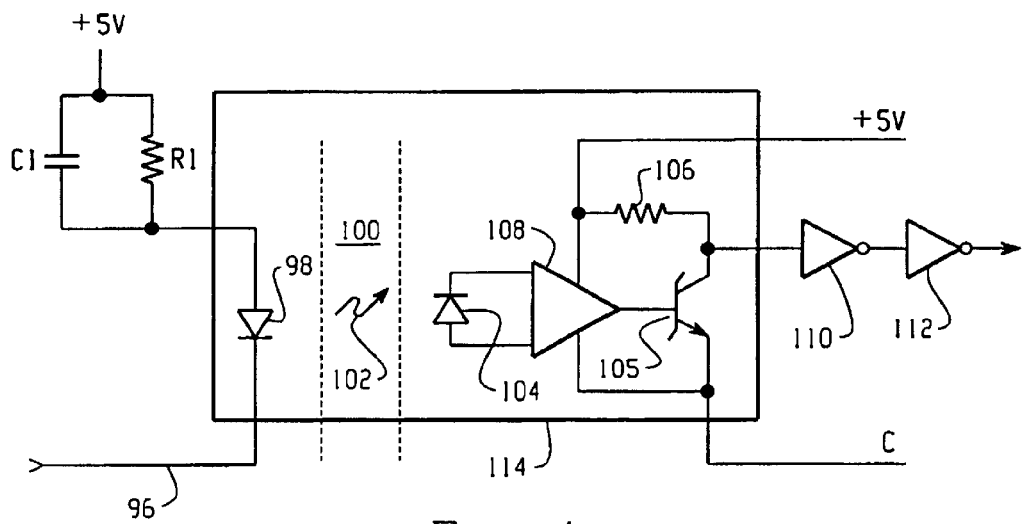
FIG. 4 is a circuit schematic of an exemplary optical isolator suitable for use in the embodiments of FIGS. 1–3.

The CLK signal, the bit serial output digital word and the busy signal are coupled over signal lines 73, 80 and 82 to pins 7, 6, and 5, respectively, of a digital-to-analog converter circuit 88. In series with each signal line 73, 80 and 82 is disposed an optical isolator 90, 92 and 94, respectively. A circuit schematic of an exemplary optical isolator suitable for use in the embodiment of FIG. 3 is shown in FIG. 4. Referring to FIG. 4, the bit or pulsed input signal (over line 73, 80 or 82) is coupled to the cathode of a photodiode 98 over signal line 96. The anode of photodiode 98 may be coupled to a +5V supply through a filter circuit comprising resistor R1 and capacitor C1 in parallel. The +5V may be supplied from the voltage regulator circuit on the respective side of barrier 20 (see FIGS. 1 and 2). With each input pulse over signal line 96, a pulse of current is conducted from the +5V supply through a photo-diode 98, which may be a light emitting diode (LED), for example. The LED 98 converts the current pulses to light pulses 102 which are transmitted across an electrically non-conductive barrier 100 illustrated between dashed lines. In the present embodiment, the barrier 100 may be comprised of a glass material which can withstand electrical voltage potentials on the order of two thousand volts (2000V) or more, for example.

On the other side of the non-conductive barrier 100 may be a another photodiode 104 which receives the pulsed light 102 and converts each received light pulse to a current which is detected and amplified by an amplifier circuit 108 which is powered by a +5V supply. The output of amplifier 108 is coupled to the base of a transistor 105. The collector of transistor 105 is coupled to a +5V supply through a resistor 106 and the emitter of transistor 105 is coupled to a common potential. The +5V and common potentials may be supplied from the voltage regulator on the respective side of barrier 20 (see FIGS. 1 and 2). Accordingly, a voltage pulse is produced at the collector of transistor 105 with each light pulse received by the photodiode 104. A pair of inverter circuits 110 and 112 may be coupled in series to the collector of transistor 105 for inverting each voltage pulse to its proper state and cleaning up the edges thereof. The inverters 110 and 112 may also be powered by the +5V and common potentials of the respective voltage regulator. The circuitry shown within the solid line 114 may be a packaged circuit of the type manufactured by Honeywell under the model no. HCPL 2300, for example. Alternatively, the photodiode 104 may be replaced with a photo-transistor circuit, for example.

In this manner and as shown in FIG. 3, the optical isolator 92 is coupled in series with the output lines 80 of the analog-to-digital converter circuit for converting the electrical digitally coded words output sequentially therefrom into light signals representative thereof which are passed across an electrically non-conductive barrier 100, and for reconverting the light signals back into the electrical digitally coded words after crossing the non-conductive barrier 100, the reconverted electrical digitally coded words being output sequentially from the optical isolator 92 to the digital-to-analog converter circuit 88. In the same or similar manner, the optical isolator 90 which is coupled in series with the signal line 73 passes the synchronizing pulses of the clock signal CLK between the analog-to-digital converter circuit 72 and digital-to-analog converter circuit 88. In turn, the digital-to-analog converter circuit 88 is operative to receive the bits of each digitally coded word from the optical isolator 90 synchronously as governed by the clock signal CLK. Likewise, optical isolator 94 which is coupled in series with the signal line 82 passes the busy signal between the analog-to-digital converter circuit 72 and digital-to-analog converter circuit 88. The non-conductive barriers 100 of the optical isolators 90, 92 and 94 together prevent potentially dangerous electrical threats from entering the adverse environment 14 over the respective electrical conductor.

Returning to FIG. 3, each time the busy signal of line 82 is generated, the digital-to-analog converter circuit 88 is enabled to load serially into a conversion register thereof the 16 bits of the digital word received from the optical isolator 92 synchronized by the clock signal CLK received from the optical isolator 90. The digital-to-analog circuit 88 may be an integrated circuit of the type manufactures by Linear Technologies Corp. bearing model no. LTC 1595, for example, which includes a weighted ladder network for performing the digital-to-analog conversion on the 16 bit digital word stored in the conversion register thereof. The analog signal output at pin 3 of circuit 88 is gain adjusted by an operational amplifier 116, pin 3 being coupled to the inverting (−) input thereof. In the particular embodiment, the gain of amplifier 116 is set by a gain resistor which is included in circuit 88 and coupled across the inverting (−) input or pin 3 and the output of the amplifier 110 via pin 2 of circuit 88. A capacitor 117 may be coupled in parallel with the gain resistor.

As each digital word is loaded into the conversion register of circuit 88 as may be indicated by the termination of the busy or load signal over line 82, for example, the circuit 88 performs a digital-to-analog conversion of the loaded digital word. In this manner, the time samples of the analog input signal are reconstructed sequentially at the output of amplifier 116 without affecting substantially the accuracy thereof. An anti-aliasing, low pass filter circuit 118 may be coupled to the output of amplifier 116 for filtering the sequentially generated time samples to reconstruct an accurate representation of the analog input signal which is passed over the respective signal line as the measurement signal or excitation signal as the case may be.

In the present embodiment, the eight megahertz (8 MHz) gated clock is used to govern the time sampling and digital word conversions of circuit 72. Accordingly, the analog input signal is time sampled at a rate of approximately four hundred and forty-four thousand samples per second (444K sps), i.e. 8 MHz/18 (the circuit 68). In addition, the sequentially generated digital words are passed to the circuit 88 every 2.25 microseconds and the analog time samples are reconstructed sequentially by circuit 88 at a rate of approximately 444K sps. While this configuration accommodates an analog input signal over a substantially wide operating frequency bandwidth, it is understood that the invention is not so limited. For example, the clock signal may be slowed to a lower clock rate by a divider circuit, and/or the circuit 68 may be adjusted to produce a convert signal over a greater number of pulses. Thus, the sampling rate of the analog-to-digital converter circuit 72 may be set at a predetermined rate based on the characteristics of the analog input signal, i.e. AC, DC or pulsed, and a desired response time. However, in order to accurately reconstruct the analog input signal at the output of the digital-to-analog circuit 88, the sampling rate of the analog-to digital converter circuit 72 should be set to a sampling rate at least twice the highest expected frequency component of the analog input signal.

Also, while the analog-to-digital circuit 72 of the present embodiment generates sequentially the digitally coded words in a bit serial manner, it is understood that an alternate embodiment of circuit 72 may generate such digital words in a parallel format without deviating from the broad principles of the present invention. If in such an alternate embodiment, the sequentially generated digital words are passed to the digital-to-analog converter circuit 88 in a parallel format, the number of optical isolators will correspond to the number of bits of the digital word. However, no synchronizing clock or load enable signals may be needed to accommodate the reconversion to analog of the digital words of parallel format via the digital-to-analog converter circuit. Moreover, while in the present embodiment, 16 bit digital coded words are used, it is understood that the number of bits needed will be determined from the accuracy and bandwidth requirements of the system and whether the bits are to be transmitted serially or in parallel across the barrier.

Figure 5:
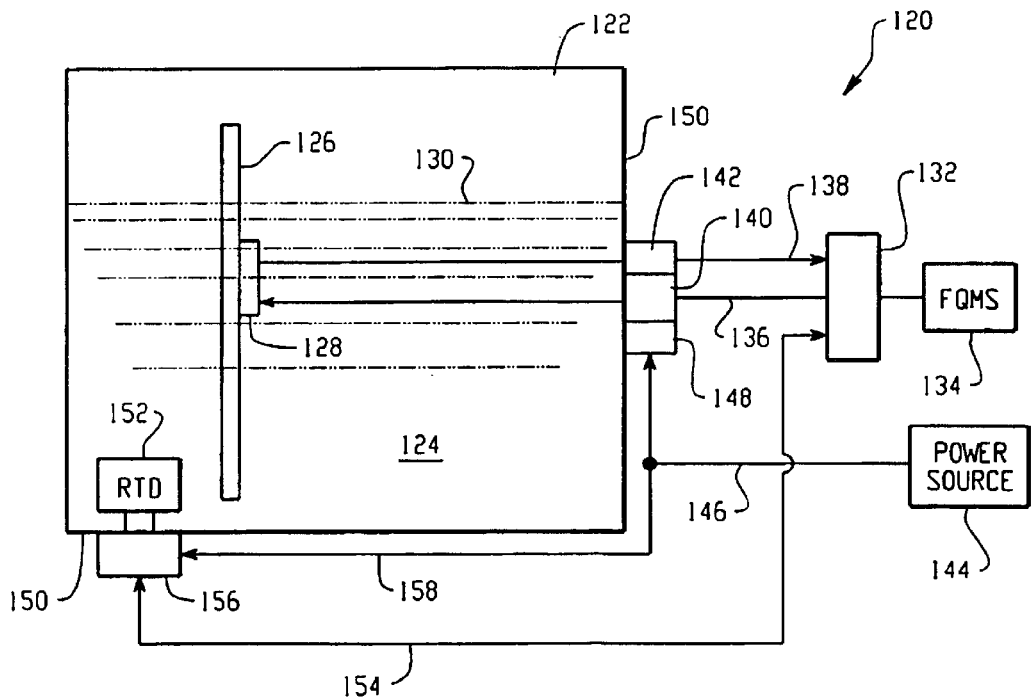
FIG. 5 is a block diagram illustration of a system for embodying yet another aspect of the present invention.

An exemplary embodiment of a system 120 for measuring a parameter inside an adverse environment with a sensor disposed in the adverse environment which is coupled over electrical conductors to electrical circuits in an environment outside of the adverse environment is shown in FIG. 5. In the present example, the adverse environment comprises a container 122 of a combustible liquid 124 which may be for the present example a fuel tank of an aircraft containing a quantity of liquid fuel. In this embodiment, the tank 122 may include a capacitive probe sensor 126 and associated electronics 128 for measuring the level 130 of the combustible liquid or fuel 124 in the tank 122. An analog excitation signal may be provided to the probe 126 via electronics 128 over an electrical conductor 136 from a sensor interface circuit 132 which may be part of a fuel quantity measuring system (FQMS) 134, for example. The FQMS 134 and sensor interface 132 are disposed in an environment outside of the adverse environment or tank 122. In response to the excitation signal, an analog measurement signal may be generated from the probe 126 via electronics 128 and provided to the interface circuit 132 over an electrical conductor 138. The sensor interface 132 may be of the type described in U.S. Pat. No. 6,115,654, issued Sep. 5, 2000, entitled "Universal Sensor Interface System and Method" and assigned to the same assignee as the instant application, which patent being incorporated by reference herein for providing an interface circuit embodiment in greater detail.

The adverse environment 122 is susceptible to a combustible reaction from dangerous electrical threats received from the outside environment over the electrical conductors 136 and 138. To protect the adverse environment from potentially dangerous electrical threats, active safety barrier circuits 140 and 142 of the type described herein above are disposed in series with the electrical conductors 136 and 138, respectively, at the wall 150 of the tank 122 in a similar manner as that described in connection with the embodiment of FIG. 2 infra to pass the respective analog signals through the tank wall or barrier 150. Power is supplied to the active safety barriers 140 and 142 over a power line 146 from a power source 144. To protect the adverse environment or tank 122 from potentially dangerous electrical threats which may be passed across the barrier over the power line 146, a power line safety barrier 148 is disposed in series with the power line 146 at the tank wall 150 in a similar configuration as that described in connection with the embodiment of FIG. 2.

In operation, an analog excitation signal, which may be a sinusoidal waveform of a predetermined frequency, for example, may be generated by the interface circuit 132 and conducted over electrical conductor 136 to excite the probe 126. The analog excitation signal is passed by the safety barrier circuit 140 across the tank wall 150 to the probe 126 without affecting substantially the accuracy thereof. In response to the excitation signal, the probe 126 generates an analog measurement signal representative of the fuel level which is conducted over the electrical conductor 138 to the sensor interface 132. The analog measurement signal is passed by the safety barrier circuit 142 across the tank wall 150 to the interface circuit 132 without affecting substantially the accuracy thereof. The interface circuit 132 may signal condition the measurement signal and convert it into a liquid level parameter measurement which may be supplied to the FQMS 134 for calculating liquid quantity in the tank 122. Note that the safety barriers 140,142 and 148 protect the tank 122 containing the combustible liquid 124 from receiving potentially dangerous electrical threats and ignition sources over the electrical conductors 136, 138 and 146.

Tank 122 of the present system 120 may also include other sensors, like a resistance temperature detector (RTD)

152, for example, disposed in the combustible liquid or fuel 124. Analog excitation and measurement signals may be conducted to and from the RTD 152 over electrical conductors 154 which are coupled to the interface circuits 132. Active safety barrier circuits 156 may be coupled in series with the electrical conductors 154 in the same manner as described herein above to pass the analog excitation and measurement signals without affecting substantially the accuracy thereof while protecting the tank environment from potentially dangerous electrical threats and ignition sources conducted over the electrical conductors 154. Power may be supplied to the barrier circuits 156 from the power source 144 over power lines. Similar to that described above, a power line safety barrier may be included in the safety barrier circuits 156 for protecting the tank environment against threats and ignition sources from entering the tank 122 over the power line 158.

An analog excitation signal, which may be a DC voltage reference, for example, may be generated by the interface circuit 132 and conducted over one of the electrical conductors 154 to pass current through the RTD 152. The analog excitation signal is passed by the safety barrier circuits 156 across the tank wall 150 to the RTD 152 without affecting substantially the accuracy thereof. An analog measurement signal representative of the current (resistance) of the RTD 152 is conducted over another of the electrical conductors 154 to the sensor interface circuit 132. The analog measurement signal is passed by the safety barrier circuits 156 across the tank wall 150 to the interface circuit 132 without affecting substantially the accuracy thereof. The interface circuit 132 may signal condition the measurement signal and convert it into a temperature parameter measurement which may be supplied to the FQMS 134 to assist in calculating liquid quantity in the tank 122. Note that the safety barrier circuits 156 protect the tank 122 containing the combustible liquid 124 from receiving potentially dangerous electrical threats and ignition sources over the electrical conductors 154 and 158.

While the present exemplary embodiment is described as using only a capacitive probe and RTD sensor for measuring parameters in a fuel tank, it is understood that other sensors, like an ultrasonic transducer for measuring fuel level, and a strain gauge for measuring either liquid or ullage pressure, for example, may be used just as well without deviating from the broad principles of the present invention.

Accordingly, the present invention should not be limited in any way, shape, or form to the various embodiments described herein above which were used merely to present the invention by way of example. Rather, the present invention should be construed in breadth and broad scope in accordance with the recitation of the claims appended hereto.

What is claimed is:

1. A system for measuring a parameter inside an adverse environment that is susceptible to a combustible reaction from dangerous electrical threats received over an electrical conductor from an environment outside of said adverse environment, said system comprising:

a sensor disposed inside said adverse environment for measuring said parameter and generating an electrical analog signal representative of said measurement over said electrical conductor;

electrical circuitry disposed in said outside environment for receiving said electrical analog measurement signal from said sensor over said electrical conductor;

an active safety barrier circuit disposed in series with the electrical conductor at the barrier between the adverse environment and the outside environment for passing said electrical analog measurement signal from the sensor to the electrical circuitry over the electrical conductor while preventing potentially dangerous electrical threats from entering the adverse environment over said electrical conductor, said safety barrier circuit comprising:

an analog-to-digital converter circuit for converting sequential time samples of said analog measurement signal to a train of electrical multiple bit digitally coded words representative thereof, said electrical digitally coded words of said train being output sequentially from said analog-to-digital converter circuit;

an optical isolator coupled to the analog-to-digital converter circuit for converting the electrical digitally coded words output therefrom into light signals representative thereof which are passed across an electrically non-conductive barrier, and for reconverting said light signals back into the electrical multiple bit digitally coded words after crossing said non-conductive barrier, said reconverted electrical digitally coded words being output sequentially from said optical isolator, said non-conductive barrier for preventing potentially dangerous electrical threats from entering the adverse environment over said electrical conductor; and a digital-to-analog converter circuit coupled to the optical isolator for reconstructing said analog measurement signal from the reconverted electrical multiple bit digitally coded words being received sequentially from the optical isolator, said reconstructed analog measurement signal being passed from the digital-to-analog converter circuit to the electrical circuitry at the outside environment over the electrical conductor.

2. The system of claim 1 wherein the electrical circuitry includes power source for generating electrical energy over a power line conductor to the active safety barrier circuit; and including a power line safety barrier circuit disposed in series with said power line conductor at the barrier between the adverse environment and the outside environment for passing said electrical energy from the power source to the analog-to-digital converter circuit of the safety barrier circuit while preventing potentially dangerous electrical threats from entering the adverse environment over said power line conductor.

3. The system of claim 2 wherein the power line safety barrier circuit comprises: an isolation transformer for passing electrical energy to the analog-to-digital converter circuit of the safety barrier circuit while preventing potentially dangerous electrical threats from entering the adverse environment over the power line conductor.

4. The system of claim 1 wherein the electrical circuitry includes excitation circuitry for generating an electrical excitation signal to the sensor over a second electrical conductor; and including a second active safety barrier circuit disposed in series with said second electrical conductor at the barrier between the adverse environment and the outside environment for passing said electrical excitation signal from the excitation circuitry to the sensor over said second electrical conductor while preventing potentially dangerous electrical threats from entering the adverse environment over said second electrical conductor, said second safety barrier circuit comprising:

an analog-to-digital converter circuit for converting sequential time samples of said analog excitation signal to a train of electrical digitally coded words representative thereof, said electrical digitally coded words of said train being output sequentially from said analog-to-digital converter circuit;

an optical isolator coupled to the analog-to-digital converter circuit for converting the electrical digitally coded words output therefrom into light signals representative thereof which are passed across an electrically non-conductive barrier, and for reconverting said light signals back into the electrical digitally coded words after crossing said non-conductive barrier, said reconverted electrical digitally coded words being output sequentially from said optical isolator, said non-conductive barrier for preventing potentially dangerous electrical threats from entering the adverse environment over said second electrical conductor; and a digital-to-analog converter circuit coupled to the optical isolator for reconstructing said analog excitation signal from the reconverted electrical digitally coded words being received sequentially from the optical isolator, said reconstructed analog excitation signal being passed from the digital-to-analog converter circuit to the sensor in the adverse environment over the second electrical conductor.

5. The system of claim 4 wherein the electrical circuitry includes a power source for generating electrical energy over a power line conductor to the second active safety barrier circuit; and including a power line safety barrier circuit disposed in series with said power line conductor at the barrier between the adverse environment and the outside environment for passing said electrical energy from the power source to the digital-to-analog converter circuit of the second safety barrier circuit while preventing potentially dangerous electrical threats from entering the adverse environment over said power line conductor.

6. The system of claim 5 wherein the power line safety barrier circuit comprises: an isolation transformer for passing electrical energy to the digital-to analog converter circuit of the safety barrier circuit while preventing potentially dangerous electrical threats from entering the adverse environment over the power line conductor.

7. The system of claim 1 wherein the adverse environment comprises a container of combustible liquid; and wherein the sensor is operative to measure parameter of said liquid.

8. The system of claim 1 wherein the adverse environment comprises a fuel tank on an aircraft; wherein the sensor is operative to measure a parameter of said fuel in the tank; and wherein the barrier between the adverse and outside environments comprises a wall of the fuel tank.

9. A system for measuring a parameter inside an adverse environment with a sensor disposed inside said adverse environment, said system including electrical circuitry disposed in an environment outside of said adverse environment for generating an excitation signal which is conducted to said sensor over a first electrical conductor and for receiving an electrical analog measurement signal from said sensor over a second electrical conductor, said adverse environment susceptible to a combustible reaction from dangerous electrical threats received from the outside environment over any of the first and second electrical conductors, said system comprising:

a first active safety barrier circuit disposed in series with said first electrical conductor at the barrier between the adverse environment and the outside environment for passing said excitation signal across said barrier to the sensor over the first electrical conductor while preventing potentially dangerous electrical threats from entering the adverse environment over said first electrical conductor;

a second active safety barrier circuit disposed in series with said second electrical conductor at the barrier between the adverse environment and the outside environment for passing said analog measurement signal across said barrier to the electrical circuitry over the second electrical conductor while preventing potentially dangerous electrical threats from entering the adverse environment over said second electrical conductor; and wherein each of said first and second safety barrier circuits comprising:

an analog-to-digital converter circuit for converting sequential time samples of said excitation signal in the first safety barrier circuit and of said analog measurement signal in the second safety barrier circuit to a train of electrical multiple bit digitally coded words representative thereof in each case, said electrical digitally coded words of said train being output sequentially from said analog-to-digital converter circuit;

an optical isolator coupled at one end to the analog-to-digital converter for converting the electrical digitally coded words output therefrom into light signals representative thereof which are passed across an electrically non-conductive barrier, and for reconverting said light signals back into the electrical multiple bit digitally coded words after crossing said non-conductive barrier, said reconverted electrical digitally coded words being output sequentially from said optical isolator, said non-conductive barrier for preventing potentially dangerous electrical threats from entering the adverse environment over the respective electrical conductor; and a digital-to-analog converter circuit coupled to the optical isolator for reconstructing said excitation signal in the first safety barrier circuit and said analog measurement signal in the second safety barrier circuit from the reconverted electrical multiple bit digitally coded words being received sequentially from the optical isolator, said reconstructed excitation signal of the first safety barrier circuit being passed from the digital-to-analog converter circuit thereof to the sensor inside the adverse environment over the first electrical conductor, said reconstructed analog measurement signal of the second safety barrier circuit being passed from the digital-to-analog converter circuit thereof to the electrical circuitry at the outside environment over the second electrical conductor.

10. The system of claim 9 wherein the electrical circuitry includes a power source for generating electrical energy over a power line conductor to both of the first and second active safety barriers; and including a power line safety barrier circuit disposed in series with said power line conductor at the barrier between the adverse environment and the outside environment for passing said electrical energy from the power source to the digital-to-analog converter circuit of the first safety barrier and the analog-to-digital converter circuit of the second safety barrier circuit while preventing potentially dangerous electrical threats from entering the adverse environment over said power line conductor.

11. The system of claim 10 wherein the power line safety barrier circuit comprises: an isolation transformer for passing electrical energy to the digital-to analog converter circuit of the first safety barrier circuit and the analog-to-digital converter circuit of the second safety barrier circuit while preventing potentially dangerous electrical threats from entering the adverse environment over the power line conductor.

12. The system of claim 9 wherein the adverse environment comprises a container of combustible liquid; and wherein the sensor is operative to measure a parameter of said liquid.

13. The system of claim 9 wherein the adverse environment comprises a fuel tank on an aircraft; wherein the sensor is operative to measure a parameter of said fuel in the tank; and wherein the barrier between the adverse and outside environments comprises a wall of the fuel tank.

14. The system of claim 9 wherein each of the analog-to-digital converter circuits utilize a clock signal and a start conversion signal for converting the sequential time samples of its corresponding analog input signal into the electrical digitally coded words representative thereof; and including common circuitry disposed at the outside environment for generating and distributing said clock and start conversion signals to the analog-to digital converter circuits on both sides of the barrier.

15. The system of claim 14 wherein the clock and start conversion signals are coupled to the analog-to-digital converter circuit at the adverse side of the barrier over respective electrical conductors; and including safety barrier circuits coupled in series with said electrical conductors at the barrier.

16. The system of claim 15 wherein the safety barrier circuits for the electrical conductors of the clock and start conversion signals comprise optical safety barrier circuits.

\* \* \* \* \*